US008649660B2

(12) United States Patent
Bonarrigo et al.

(10) Patent No.: US 8,649,660 B2
(45) Date of Patent: Feb. 11, 2014

(54) MERGING OF A VIDEO AND STILL PICTURES OF THE SAME EVENT, BASED ON GLOBAL MOTION VECTORS OF THIS VIDEO

(75) Inventors: Francesco Emanuele Bonarrigo, Montichiara (IT); Marco Emanuele Campanella, Eindhoven (NL); Mauro Barbieri, Eindhoven (NL); Johannes Weda, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 152 days.

(21) Appl. No.: 13/130,077

(22) PCT Filed: Nov. 13, 2009

(86) PCT No.: PCT/IB2009/055051
§ 371 (c)(1),
(2), (4) Date: May 19, 2011

(87) PCT Pub. No.: WO2010/058334
PCT Pub. Date: May 27, 2010

(65) Prior Publication Data
US 2011/0229111 A1    Sep. 22, 2011

(30) Foreign Application Priority Data
Nov. 21, 2008    (EP) ..................................... 08169593

(51) Int. Cl.
*H04N 9/80*    (2006.01)
*G11B 27/034*    (2006.01)

(52) U.S. Cl.
CPC .................................... *G11B 27/034* (2013.01)
USPC ................ 386/242; 386/278; 348/49; 348/50

(58) Field of Classification Search
CPC ..................................................... G11B 27/034
USPC ............. 382/275; 386/239, 242, 278; 348/42, 348/46, 49, 50
See application file for complete search history.

(56) References Cited

U.S. PATENT DOCUMENTS 6,211,974 B1    4/2001   Haneda
6,686,970 B1    2/2004   Windle
(Continued)

FOREIGN PATENT DOCUMENTS

WO          9742601   A1      11/1997

OTHER PUBLICATIONS

Sikora, T.: "Trends and Perspectives in Image and Video Coding"; Proceedings of the IEEE, Vol. 93, No. 1, Jan. 2005, pp. 6-17.

(Continued)

*Primary Examiner* — Thai Tran
*Assistant Examiner* — Mishawn Dunn (57) ABSTRACT

It is quite common for users to have both video and photo material that refer to the same event. Adding photos to home videos enriches the content. However, just adding still photos to a video sequence has a disturbing effect. The invention relates to a method to seamlessly integrate photos into the video by creating a virtual camera motion in the photo that is aligned with the estimated camera motion in the video. A synthesized video sequence is created by estimating a video camera motion in the video sequence at an insertion position in the video sequence at which the still photo is to be included, creating a virtual video sequence of sub frames of the still photo where the virtual video sequence has a virtual camera motion correlated to the video camera motion at the insertion position.

12 Claims, 5 Drawing Sheets

(56) References Cited

U.S. PATENT DOCUMENTS

| | | | |
|---|---|---|---|
| 6,954,498 B1 | 10/2005 | Lipton | |
| 2002/0063775 A1* | 5/2002 | Taylor | 348/48 |
| 2003/0001846 A1 | 1/2003 | Davis et al. | |
| 2006/0026628 A1* | 2/2006 | Wan et al. | 725/32 |
| 2009/0263044 A1* | 10/2009 | Imagawa et al. | 382/275 |

OTHER PUBLICATIONS

Aner-Wolf et al: "Video De-Abstraction or How to Save Money on Your Wedding Video"; Proceedings of the Sixth IEEE Workshop on Applications of Computer Vision (WACV'02), Dec. 2002, pp. 264-268.

Farin et al: "Minimizing MPEG-4 Sprite Coding Cost Using Multi-Sprites"; Visual Communications and Image Processing 2004, Proceedings of the SPIE, vol. 5308, 2004, pp. 234-245.

Nagasaka et al: "Real-Time Video Mosaics Using Luminance-Projection Correlation"; Transactions of Thh Institute of Electronics, Information and Communication Engineers Section, vol. J82D-11, No. 10, October 1999, pp. 1572-1580.

Takeuchi et al: "Video Summarization Using Personal Photo Libraries"; Proceedings of the ACM International Multimedia Conference and Exhibition-MIR'06, Oct. 2006, pp. 213-221.

\* cited by examiner

| Parameters for sub-photo frame f-1 | Zoom factor value | | | | |
|---|---|---|---|---|---|
| | 0 | 0.01 | 0.1 | 0.5 | 1 |
| Width | 1024 | 1017 | 955 | 724 | 512 |
| Height | 768 | 763 | 717 | 543 | 384 |
| Allowed pan | 0 | 7 | 69 | 300 | 512 |
| Allowed tilt | 0 | 5 | 51 | 225 | 384 |

FIG. 6

MERGING OF A VIDEO AND STILL PICTURES OF THE SAME EVENT, BASED ON GLOBAL MOTION VECTORS OF THIS VIDEO

FIELD OF THE INVENTION

The present invention relates to a method of integrating a still photo within a video sequence. The invention moreover relates to a device and a computer program product for integrating a still photo within a video sequence.

BACKGROUND OF THE INVENTION

In our days, more and more people capture audiovisual memories of their experiences, by means of digital devices with video and photo capturing. Technologies for audiovisual memories recording are more and more widespread and efficient. It is indeed common, nowadays, to find photo cameras with the ability to record short video sequences, or mobile phones with an embedded high-resolution photo and video cameras. Since the availability of these digital devices is so pervasive, as a matter of fact most users are accustomed to record both photo and video memories of the same events, or to receive them from one or more other persons who were also present at the event. Therefore it is quite common for a user to have video and photo material that refers to the same occasion, place and time.

Many ideas and systems have been presented in order to help users in editing and managing their personal audiovisual memories, such as systems for automatic video editing and semi-automatic home video editing.

The ever-increasing capacity of storage devices allows users to shoot a great number of photos and store them without any selection. This overwhelming quantity of data, joint with the lack of proper visualization tools, may cause users to rarely watch their recorded memories.

The photo set can also be exploited to enrich the video by adding some photos inside the video. By extracting sequential sub-parts of a given photo, some small video clips can be artificially generated, and included in the video. The basic assumption is that, by adding some content-related photos inside the video stream, the resulting video will be much more informative to the user rather than considering the single video source. The Muvee Reveal AutoProducer from Muvee Technologies is an example of a commercial software package that allows inserting photos into video. The photos are animated with some virtual camera motion. The idea is that, by doing so, watching a photo can become a more pleasant experience for the user.

Although it is quite common for users to have both video and photo material that refer to the same events, few attempts have been made to exploit jointly this information, while no known attempt has been performed in order to blend the two data sources according to media aesthetic rules.

Hence, an alternative method of combining video and still photos would be advantageous, and in particular a method wherein the combination of photos and video provides enhanced user experience due to a visually more appealing experience would be advantageous.

SUMMARY OF THE INVENTION

Accordingly, the invention preferably seeks to mitigate, alleviate or eliminate one or more of the above mentioned disadvantages singly or in any combination. In particular, it may be seen as an object of the present invention to provide a method that improves the visual appearance of transitions between still photos and video.

This object and several other objects are obtained in a first aspect of the invention by providing a method of integrating a still photo within a video sequence, the method comprising the steps of obtaining a video sequence and a still photo, creating a synthesized video sequence, wherein the step of creating a synthesized video sequence includes the steps of:

estimating a video camera motion in the video sequence at an insertion position in the video sequence at which the still photo is to be included, creating a virtual video sequence of sub frames of the still photo, said virtual video sequence having a virtual camera motion, said virtual camera motion of the virtual video sequence being correlated to said video camera motion at said insertion position, and combining the video sequence and the virtual video sequence into the synthesized video sequence.

By creating a virtual video sequence of sub frames of the still photo having a virtual camera motion correlated to the video camera motion at the point of insertion within the video, a seamless transition from video to photo may be obtained. Just adding still images in the video stream would disturb the visual continuity. Animating the photos by just adding any virtual camera motion would generate unnatural and strange effects. By correlating the virtual camera motion to the video camera motion, the photos blend in seamlessly and continuously into the video stream without creating any disturbing visual or audible effects.

The term "correlated" is meant to be synonymous with "associated" or "related", and the term "the virtual camera motion is correlated to video camera motion" is meant to denote that the video camera motion is taken into account during determination of the virtual camera motion, and that the virtual camera motion to some degree is made to conform to the video camera motion. One example is that the virtual camera motion is made to be similar or identical to the video camera motion.

The term "virtual video sequence" is meant to denote a sequence of sub frames of the still photo, each sub frame being rescaled to the dimensions of the images within the video sequence, and the sequence of sub frames together possibly representing scenes in motion. The "virtual camera motion" is a visual effect in the virtual video sequence that corresponds to a simulated camera motion in a sequence of frames obtained from parts of the photo, e.g. by cropping and/or rescaling. The frame of the virtual camera motion is denoted "sub frames" or "sub frames of the still photo". Thus, the term "sub frame" is meant to denote a continuous subpart of the still photo; the sub frame is typically interpolated up to the pixel dimensions of the still photo, corresponding to a zooming in on the sub frame. The term "insertion position" is meant to denote the position within the range of frames of the video sequence, viz. a timely position. Thus, the term is not related to inserting part of a still photo within a single frame of the video sequence.

In order to make the effect of the virtual camera motion clearly visible, a hard cut between the video and the animated photos may be assumed. However, fading or dissolve transitions can be applied in order to make a transition smoother.

According to an aspect of the method, the virtual camera motion at the beginning of the virtual video sequence is correlated to the estimated camera motion in the video sequence prior to the insertion position. Hereby, a smooth transition from the video sequence to the virtual video sequence of sub frame of the still photo is achieved. Additionally or alternatively, the virtual camera motion at the end of the virtual video sequence is correlated to the estimated camera motion in the video sequence subsequent to said insertion position. Hereby, a smooth transition from the virtual video sequence of sub frame of the still photo to the video sequence is achieved.

According to another aspect of the method, the method moreover comprises the step of determining said insertion position. Such a determination of the insertion position may be based on synchronization, e.g. based on time stamp information stored together with the still photo and the video sequence. The insertion position may advantageously be determined such that the still photo is inserted between video segments recorded at a point in time close to the instant in time of taking the still photo. The insertion position may also be based on similar objects identified on the video sequence and the still photo, such as a tourist attraction occurring on both the video sequence and the still photo.

According to yet another aspect of the method, the determination comprises segmenting said video sequence into video segments and determining said insertion position in the video sequence as a position between two video segments. The segmenting of the video sequence into video segments may be a division of the video sequence into segments of related video frames, where different segments relate to different scenes, camera angles, instants in time, or other. Hereby, the insertion of the virtual video sequence corresponding to the still photo does not create extra breakups within the video sequence, in that the virtual video sequence is inserted in a position of an existing breakup within the original video sequence.

According to yet another aspect of the method, one or more specific regions of interest of the photo is/are taken into account in the step of creating said virtual video sequence. Thus, the virtual video sequence may e.g. comprise a zoom-in of a part of particular interest within the still photo.

The estimation of the video camera motion may comprise estimating the pan, tilt and/or zoom. However, other camera motion parameters might also be taken into account.

According to another aspect of the method, it may also comprise selecting sub frames of the still photo for the virtual video sequence, wherein none of the sub frames of the still photo exceeds the boundaries of the still photo for the zoom factors to be applied to the sub frames. The selection of such sub frames may comprise determination and application of a differential zoom factor for a plurality of sub frames of the still photo. The differential zoom factor is an auxiliary zoom factor which may be added to the zoom factor in a situation where a zooming out of a still photo otherwise would result in exceeding the boundary of the still photo.

The invention moreover relates to a device for integrating a still photo within a video sequence. Finally, the invention relates to a computer program product being adapted to enable a computer system comprising at least one computer having data storage means associated therewith to control device according to the invention.

This aspect of the invention is particularly, but not exclusively, advantageous in that the present invention may be implemented by a computer program product enabling a computer system to perform the method of the invention. Thus, it is contemplated that some known device, such as a video camera device, may be changed to operate according to the present invention by installing a computer program product on a computer system controlling the device. Such a computer program product may be provided on any kind of computer readable medium, e.g. magnetically or optically based medium, or through a computer based network, e.g. the Internet.

The different aspects of the present invention may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

DETAILED DESCRIPTION OF AN EMBODIMENT

Figure 1:
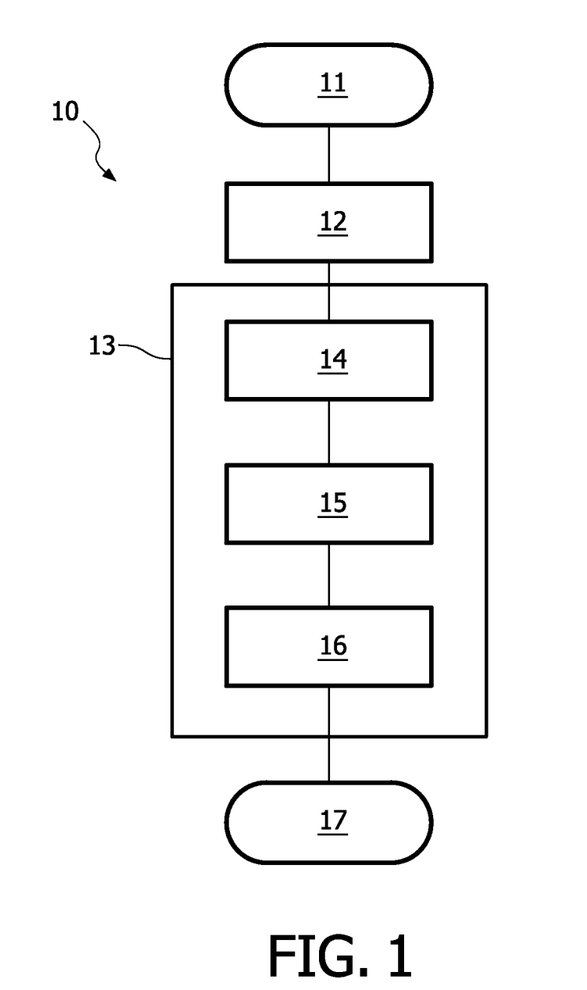
FIG. 1 is a flow-chart of a method according to the invention.

FIG. 1 is a flow-chart of a method 10 according to the invention. The method 10 starts in 11 and continues to step 12, wherein a video sequence and a still photo are obtained.

The method continues to step 13 wherein a synthesized video sequence is created.

Step 13 comprises steps 14-16, whereof step 14 comprises estimating a video camera motion in the video sequence at an insertion position in the video sequence at which the still photo is to be included. The camera motion estimation typically comprises the pan, tilt and zoom parameters of the video sequence. In the subsequent step 15, a virtual video sequence of sub frames of the still photo is created, where the virtual video sequence has a virtual camera motion and where the virtual camera motion of the virtual video sequence is correlated to the video camera motion at said insertion position. Subsequently, in step 16, the video sequence and the virtual video sequence are combined into the synthesized video sequence. The method ends in step 17.

Figure 2:
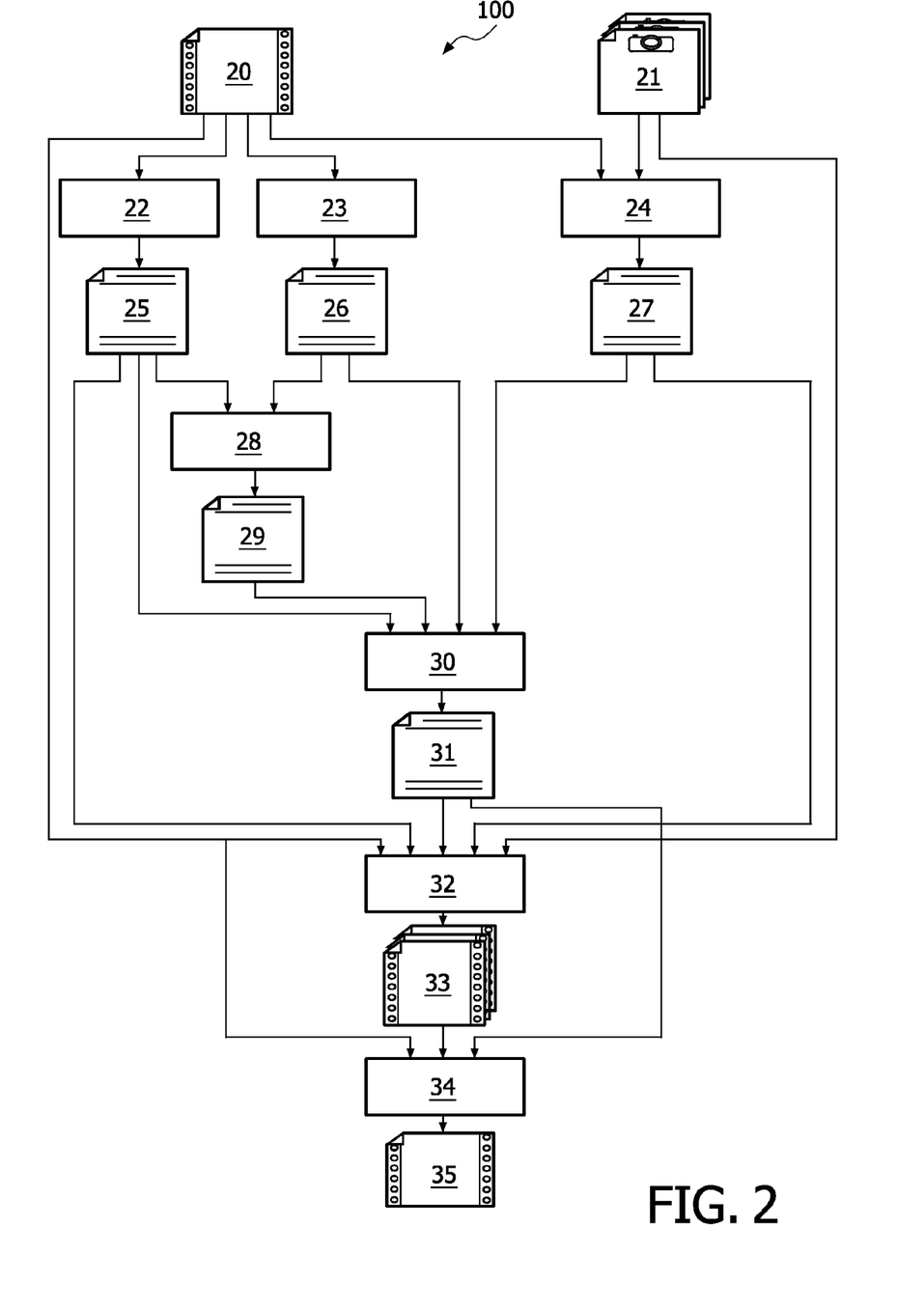
FIG. 2 is a schematic drawing of an example of the method according to the invention.

FIG. 2 is a schematic drawing of an example of the method 100 according to the invention. In the method 100, the input consist of an original video 20 and a number of still photos from a photo set 21. In 22, the camera motion in the original video is estimated. Camera motion may be estimated by estimating the camera motion parameters: pan, tilt and zoom. However, additionally the following camera motion parameters could also be estimated: rotation, tracking, booming and dolling. The document "Real-time video mosaics using Luminance-Projection Correlation", IEICE Transactions on Information and Systems, Pt. 2 (Japanese Edition), vol. J82-D-2; no. 10; page. 1572-1580 (1999), Akio Nagasaka, Takafumi Miyatake, describes an example of how camera motion parameters could be estimated. Block 22 results in a set of estimated motion parameters 25 which are subsequently exploited in order to synthesize coherent transitions between video and photos.

In block 23 other low-level features of the images in the video are estimated, resulting in a set of estimated low level features 26. Such low-level features may comprise one or more of the following: edge detection, corner detection, blob detection, ridge detection, scale-invariant feature transform. The set of estimated low-level features 26 may subsequently be used during segmentation of the video, a summarization process and in the process of determining start and end parameters for the video transition synthesis.

In block 28 the set of estimated motion parameters 25 and the set of estimated low level features 26 are employed in a segmentation process, wherein the original video 20 is divided into a set of video segments 29.

In block 24, time synchronization between the original video 20 and the photo set 21 is performed, e.g. by exploiting timestamp information. However, other appropriate synchronization method may be used, as for instance those described in Yuichiro Takeuchi, Masanori Sugimoto, "Video Summarization using Personal Photo Libraries", Proceedings of the 8$^{th}$ ACM international workshop on Multimedia Information Retrieval, October 2006, or in Aya Aner-Wolf, Lior Wolf, "Video de-Abstraction or how to save money on your wedding video", Proceedings of the 6$^{th}$ IEEE Workshop on Applications of Computer Vision, 2002. The result of the synchronization process 24 is a synchronized video and photo set 27.

In block 30, a summarization process is performed, wherein the video segments suitable for forming a video summary are selected: The suitability of the video segments for the summary may be determined by e.g. the low-level features of the segment and the number of photos synchronized in that segment. The result of the process 30 is a video-photo composition segment set 31.

In block 32 the transitions between the video and the photos are synthesized. The process 32 uses the estimated motion parameters 25, a photo from the photo set 21 or from the synchronized photo set 27, a portion of video from the original video 20 or from the video-photo composition segment set 31 as well as information on the point in time of insertion of the photo inside the video. Moreover, the process 32 may take one or more regions of interest of the photo into account. The process 32 is described in further detail in relation to FIG. 3. The result of the process 32 is a set of transition segments 33, used in an optional subsequent re-encoding process in block 34. In this re-encoding process 34 the video stream is re-encoded in order to provide an synthesized video sequence 35 which may include part of the original video 20 enriched with photo(s) from the photo set 21 and the transitions between the original video and the inserted photo(s). As mentioned, the re-encoding process is optional in that it is conceivable that all the operations were performed in real-time while rendering the sequence. Alternatively, a description of the transformations and transitions that have to be applied to obtain the final video may be stored, in the form of playlist, multimedia presentation description, or code. During rendering, an appropriate player may be arranged for interpreting the description and create the final sequence on-the-fly. Examples of languages and players that can be used are Macromedia Flash (proprietary) and SMIL (standard).

Figure 3:
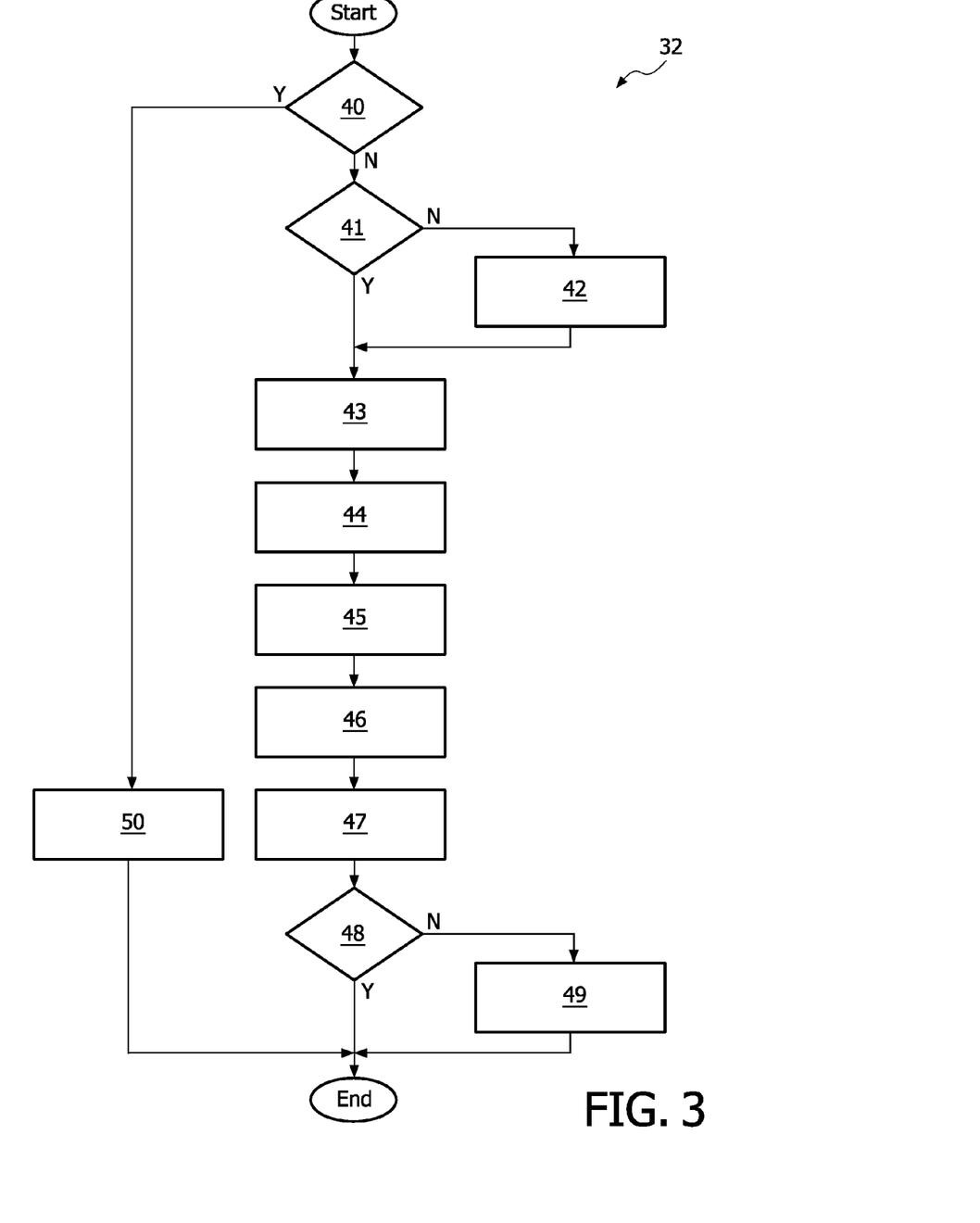
FIG. 3 a schematic drawing of an example of the steps performed in video transition synthesizing of FIG. 2.

FIG. 3 a schematic drawing of an example of the steps performed in video transition synthesizing 32 of FIG. 2. The video synthesizing 32 relates to any transition, viz. a transition between two still photos, a transition from a still photo to a video segment or a transition from a video segment to a still photo. In step 40, the step of determining whether the transition is a transition from a photo to a photo. In the affirmative, the method proceeds to step 50, wherein a fading effect between the two still photos is performed, and the method ends subsequently. In the negative, the method continues to step 41, wherein it is determined whether the transition is a fade-out transition, viz. a transition from a video segment to a photo, possibly with a fading effect between the video segment and the photo. Such a fading effect is described in connection with the optional step 46. In the case where it is determined that the transition is not a fade out transition, the method continues to step 42, wherein the estimated motion parameters obtained in block 25 as a result of step 22 of the method 100 in FIG. 2 are rearranged. A transition that is neither a transition from one still photo to another nor from a video segment to a still photo must be a transition from a still photo to a video segment, and such a transition may be handled by mirroring the estimated motion parameters and treating the transition as a transition from a video segment to a still photo. The method continues from block 42 to 43; the method also continues from block 41 to block 43 in case of the result in block 41 being positive.

In block 43, three motion parameter curves for the sub frames are calculated. The three motion parameters, viz. pan, tilt, zoom, need to correspond to the detected motion of the video segments surrounding the photo. As mentioned in relation to FIG. 2, the virtual camera motion may also depend on the regions of interest of the photo (not shown in the Figures).

Figure 4:
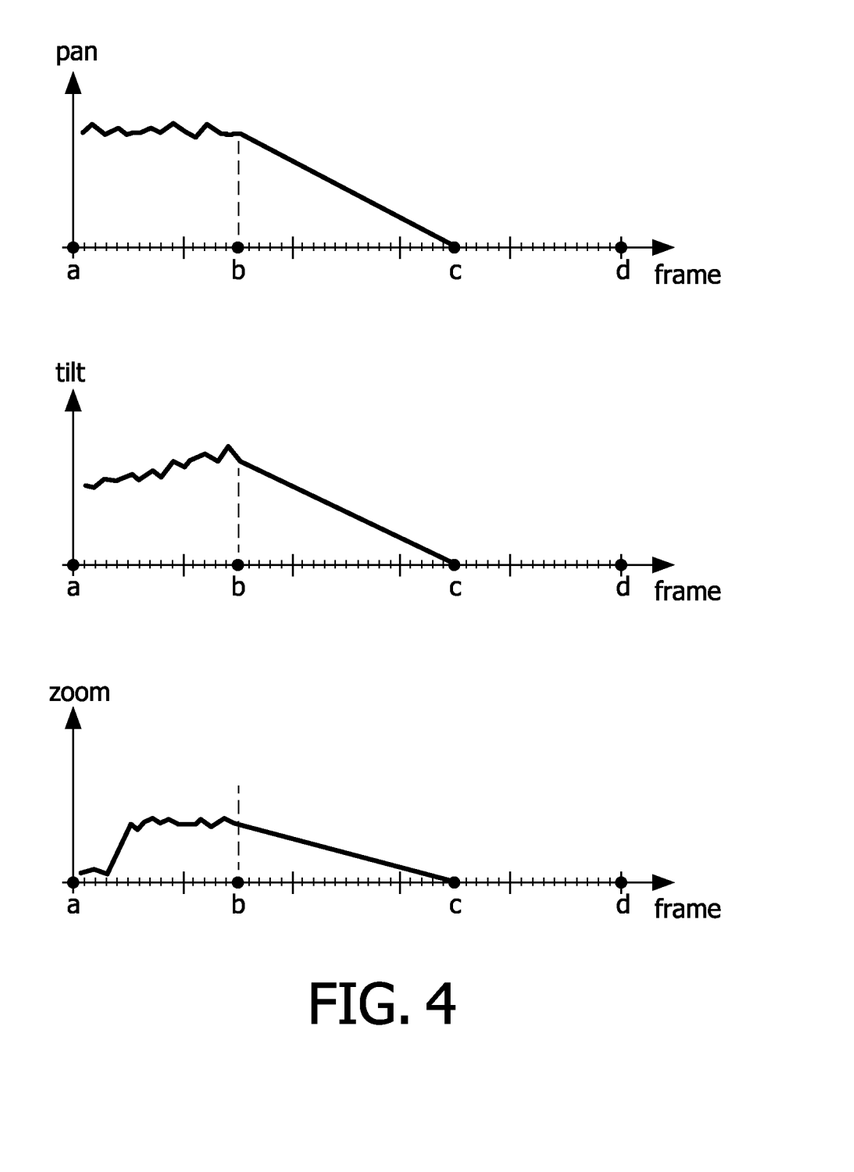
FIG. 4 shows diagrams of three camera motion parameters.

A possible implementation of block 43 is described in connection with FIG. 4. In FIG. 4, an example of diagrams of the motion parameters pan, tilt and zoom is shown. The points along the X-axis denote frames of a video in chronological order. Thus, frame a is prior to frame b, etc. FIG. 4 shows an example where a customizable interval of motion values, from point a to b in the graphs in FIG. 4 are the same as for the video frames. In a subsequent, customizable interval of frames a linear decrease is applied, from point b to c, and in a later part, from point c to d, the values are set to 0 corresponding to a situation where a photo stands still. Thus, the example of FIG. 4 corresponds to a situation where the estimated motion parameters for the video frames are followed in the beginning, slowing down smoothly, and stopped at the end.

The calculation of the graph value at point b, for each curve, can be performed by weighted mean of the values in the interval [a,b] of the data, using the following formula where x represents the motion parameter (pan, tilt or zoom) and n is equal to b−a+1:

$$\overline{x} = \frac{\sum_{i=1}^{n} x_i \cdot w_i}{\sum_{i=1}^{n} w_i}$$

$$w_i \left[ \frac{1}{n}, \frac{2}{n}, \dots, 1 \right]$$

Referring again to FIG. 3, the method continues to block 44, wherein an additional zoom factor to be added to the estimated motion parameter, zoom, is determined. The an additional zoom factor is calculated in order to ensure that no sub frame to be included in the virtual video sequence exceeds the boundaries of the still photo of which it is a part. For example, in the case where a high zoom factor is applied to a sub frame being close to the boundary of the still photo and a zoom-out is initiated, a situation might occur wherein sufficient information for all parts of the zoomed out sub frame does not exist. In order to avoid this situation, which might lead to unwanted black stripes appearing in the sub-photo frame, an algorithm for choosing appropriate sub-photo frames from the motion parameters is used.

In order to synthesize the sub-photo frames, the algorithm needs the centre and dimension for each one of them. The following formulas apply to the previous case in which a linear decrease of the motion is followed by a still shot of the entire photo:

$$\begin{cases} X_{i-1}^c = X_i^c - pan_{i-1} \\ Y_{i-1}^c = Y_i^c - tilt_{i-1} \end{cases}$$

$$\begin{cases} width_{i-1} = \dfrac{width(i)}{scale_{i-1}} \\ height_{i-1} = \dfrac{height(i)}{scale_{i-1}} \end{cases}$$

Where:
i=[transitionFrame, . . . , 1]
$X_i^c$=horizontal centre coordinate for frame i
$Y_i^c$=vertical centre coordinate for frame i
scale(i)=$2^{zoom(i)}$ Since the coordinate parameters for frame f−1 entirely depend upon their value at frame f, and the motion parameters at frame f−1, there is no pre-emptive assurance that the motion parameters do not lead to exceed the photo boundary. Should this happen, no information can be synthesized for this portion of the sub-photo frame, therefore some unwanted black stripes would appear in the interpolated sub-photo frame. In order to avoid this problem the algorithm checks, for each frame, if the photo boundaries are exceeded, and if so the zoom factor for that particular frame is increased enough to make the dimensions fit again.

The benefit in doing so is that, by increasing the zoom factor, the sub-photo frame will represent a limited portion of the photo. In these conditions, a specific nominal value of translation corresponds to a lower absolute value. For example in the case of a sub-photo corresponding to a zoom factor of 1, a pan throughout the entire sub-photo will correspond to a pan through only half of the still photo of which the sub-photo frame is a part.

Figure 6:
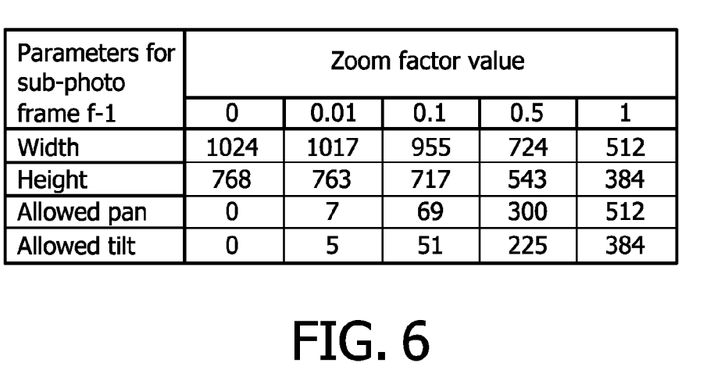
FIG. 6 indicating allowed translation values for different zoom values.

In the following an example of this effect is described. Starting by a sub-photo frame that represents the entire photo (of width 1024 and height 768), based on the zoom factor for the previous frame the allowed translation values, viz. the allowed pan and tilt, tend to increase as shown in FIG. 6 indicating allowed translation values for different zoom values.

Figure 5:
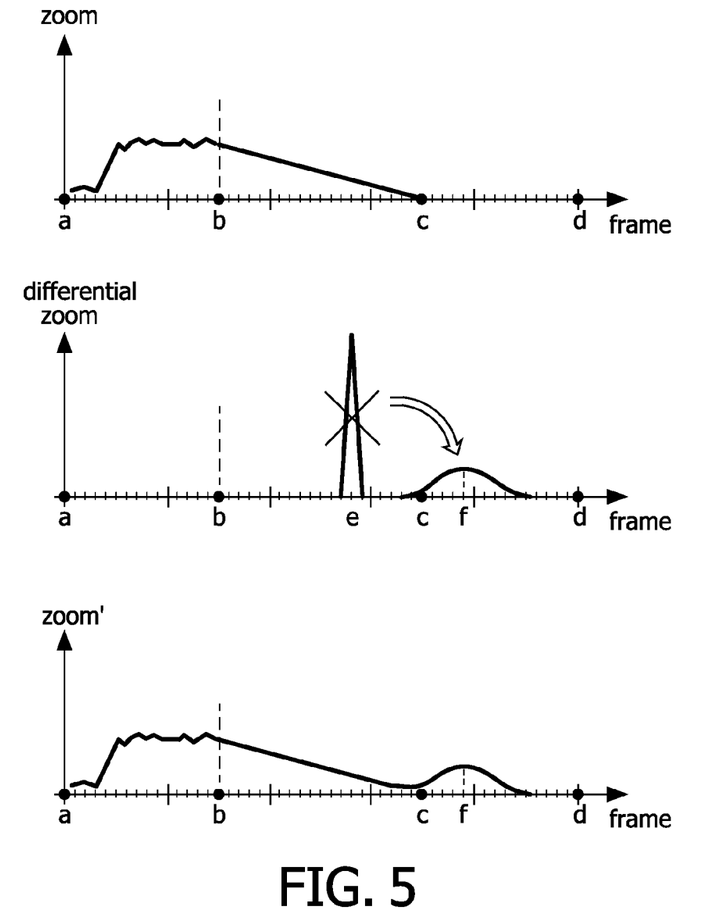
FIG. 5 shows diagrams of a zoom parameter, an adjusted zoom parameter and the resulting zoom parameter after adjustment.

FIG. 5 shows diagrams of three zoom parameters, viz. an initial zoom parameter, zoom, a differential zoom parameter and the resulting zoom parameter, zoom', after adjustment. The zooms parameter are calculated backwards from point d to point b.

The differential zoom parameter is calculated and applied in order to avoid any situation wherein a zoom-out could lead to a sub frame exceeding the boundaries of the still photo.

FIG. 5 shows a situation wherein a differential zoom parameter different from zero has been determined. In the frame at point e, a differential zoom factor would be necessary in order to avoid the situation wherein a necessary sub frame would exceed the boundaries of the still photo. This is indicated at the middle curve of FIG. 5 as the apex at point e. However, the calculated differential zoom parameter should not be added in isolation at the frame e for which it is needed, since this concentrated value would create an abrupt change in the zoom factor curve. The differential zoom parameter is applied at the zoom factor curve at point f, which is half the way between the frame for which it is needed and the last frame, point d and point e in FIG. 5. A Gaussian distribution is used to spread the zoom amount over the interval [e,d], in such a way that abrupt transitions are avoided. The resultant zoom factor, zoom' (lower curve in FIG. 5), corresponds to an addition of the differential zoom factor (middle curve in FIG. 5) to the zoom factor (upper curve in FIG. 5).

The differential zoom factor must be calculated and completely added to the zoom factor before the frame for which it is needed. The application of the resultant zoom parameter to the sub-frames between the points d and e, corresponds to a change in the sub-frames of the still photo disclosed in the virtual video sequence. In point d, the sub frame is the same in all three graphs of FIG. 5; however at point e and at the points between frame d and frame e, the sub frame are different after application of the differential zoom parameter compared with the sub frames to which the zoom parameters of the upper curve in FIG. 5 were applied.

An example of a pseudo code for the algorithm for calculating the frame dimensions is given in the following:

```
...
repeatForCycle = 1;
while repeatForCycle == 1
    repeatForCycle = 0;
    for i from lastFrame-1 to firstFrame
        calculate centre and dimension for sub-photo frame i;
        if sub-photo frame exceeds photo size
            calculate differential zoom D';
            add D' to the zoom parameter curve using a
            Gaussian distribution;
            repeatForCycle = 1;
            break;
        end if
    end for
end while
...
```

When a sub frame exceeds the boundaries of the still photo, the calculation of dimension and position of all the sub frames is restarted. Once this operation has been performed, an array containing the centre and the dimension of each sub frame is available. For each sub frame of the photo, its centre and dimension are known. It is therefore possible to apply an interpolation method in order to determine, for each pixel of the sub frame, the corresponding pixel within the still photo.

Referring again to FIG. 3, the method continues to block 45 wherein the centre, width and height for each sub frame is calculated, and further to block 46 wherein the sub frames of the still photo are synthesized by interpolation of the photo.

In a subsequent, but optional, step 47 a fading effect is effected between the video frames and the sub frames of the still photo. In step 48, it is determined whether the transition is a fade-out transition, viz. a transition from a video segment to a photo. In the negative case, the method continues to step 49 wherein the frame order for the synthesized transition is inverted. Hereafter the method ends. In the affirmative case of step 48, the method also ends.

As described above, the method 32 in FIG. 3 is an example of the method step 32 of the method 100 in FIG. 2. The result of the method step 32 is a set of transition segments 33 which may be re-encoded to obtain a synthesized video sequence 35.

The invention can be implemented in any suitable form including hardware, software, firmware or any combination of these. The invention or some features of the invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method of integrating a still photo within a video sequence, the method comprising the steps of:
   obtaining a video sequence and a still photo,
   creating a synthesized video sequence, wherein the step of creating a synthesized video sequence includes the steps of:
   estimating a video camera motion in the video sequence at an insertion position in the video sequence at which the still photo is to be included,
   creating a virtual video sequence of sub frames of the still photo, said virtual video sequence having a virtual camera motion, said virtual camera motion of the virtual video sequence being correlated to said video camera motion at said insertion position, wherein each sub frame of the sub frames of the still photo is rescaled to dimensions of images within the video sequence, and wherein the virtual camera motion comprises a visual effect in the virtual video sequence that corresponds to a simulated camera motion in a sequence of the sub frames obtained from parts of the still photo, and
   combining the video sequence and the virtual video sequence into the synthesized video sequence, wherein the estimation of the video camera motion comprises estimating the pan, tilt and/or zoom, the method further comprising the steps of:
   selecting sub frames of the still photo for the virtual video sequence, wherein none of the sub frames of the still photo exceeds the boundaries of the still photo for the zoom factors to be applied to the sub frames.

2. The method according to claim 1, wherein said virtual camera motion at the beginning of the virtual video sequence is correlated to the estimated camera motion in the video sequence prior to said insertion position.

3. The method according to claim 1, wherein said virtual camera motion at the end of the virtual video sequence is correlated to the estimated camera motion in the video sequence subsequent to said insertion position.

4. The method according to claim 1, further comprising the step of determining said insertion position.

5. The method according to claim 4, wherein said determination comprises segmenting said video sequence into video segments and determining said insertion position in the video sequence as a position between two video segments.

6. The method according to claim 4, wherein said determination comprises synchronizing the photo and the video segments.

7. The method according to claim 1, wherein one or more specific regions of interest of the photo is taken into account in the step of creating said virtual video sequence.

8. The method according to claim 1, wherein a differential zoom factor is applied for a plurality of sub frames of the still photo.

9. A method of integrating a still photo within a video sequence, the method comprising the steps of:
   obtaining a video sequence and a still photo,
   creating a synthesized video sequence, wherein the step of creating a synthesized video sequence includes the steps of:
   estimating a video camera motion in the video sequence at an insertion position in the video sequence at which the still photo is to be included,
   creating a virtual video sequence of sub frames of the still photo, said virtual video sequence having a virtual camera motion, said virtual camera motion of the virtual video sequence being correlated to said video camera motion at said insertion position, and
   combining the video sequence and the virtual video sequence into the synthesized video sequence, wherein the estimation of the video camera motion comprises estimating the pan, tilt and/or zoom, the method further comprising the steps of:
   selecting sub frames of the still photo for the virtual video sequence, wherein none of the sub frames of the still photo exceeds the boundaries of the still photo for the zoom factors to be applied to the sub frames.

10. The method according to claim 9, wherein a differential zoom factor is applied for a plurality of sub frames of the still photo.

11. A device for integrating a still photo within a video sequence, the device comprising:
    an input for obtaining a video sequence and a still photo,
    processing means for creating a synthesized video sequence, wherein the processing means for creating a synthesized video sequence includes:
    means for estimating a video camera motion in the video sequence at an insertion position in the video sequence at which the still photo is to be included,
    means for creating a virtual video sequence of sub frames of the still photo, said virtual video sequence having a virtual camera motion, said virtual camera motion of the virtual video sequence being correlated to said video camera motion at said insertion position, wherein each sub frame of the sub frames of the still photo is rescaled to dimensions of images within the video sequence, and wherein the virtual camera motion comprises a visual effect in the virtual video sequence that corresponds to a simulated camera motion in a sequence of the sub frames obtained from parts of the still photo, and
    means for combining the video sequence and the virtual video sequence into the synthesized video sequence, wherein the estimation of the video camera motion comprises estimating the pan, tilt and/or zoom, the device further comprising:
    means for selecting sub frames of the still photo for the virtual video sequence, wherein none of the sub frames of the still photo exceeds the boundaries of the still photo for the zoom factors to be applied to the sub frames.

12. A non-transitory computer readable medium embodied with a computer program that includes instructions adapted to enable a computer system comprising at least one computer having data storage means associated therewith to control a signal processing unit according to claim 1.

* * * * *